(12) United States Patent
Coleman et al.

(10) Patent No.: US 12,214,891 B2
(45) Date of Patent: Feb. 4, 2025

(54) ENGINE BACKBONE BENDING REDUCTION

(71) Applicant: General Electric Company, Schenectady, NY (US)

(72) Inventors: Jonathan E. Coleman, Mason, OH (US); Timothy L. Schelfaut, Lebanon, OH (US); Anthony M. Metz, Harrison, OH (US); Thomas P. Joseph, West Chester, OH (US); Mahesh Khandeparker, Bengaluru (IN); Kudum Shinde, Bengaluru (IN); Donald L. Gardner, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/450,071

(22) Filed: Aug. 15, 2023

(65) Prior Publication Data

US 2024/0150027 A1    May 9, 2024

Related U.S. Application Data

(62) Division of application No. 16/836,442, filed on Mar. 31, 2020, now abandoned.

(51) Int. Cl.
*B64D 27/40* (2024.01)
*F02K 3/06* (2006.01)
(Continued)

(52) U.S. Cl.
CPC .............. *B64D 27/40* (2024.01); *F02K 3/06* (2013.01); *B64D 27/18* (2013.01); *B64D 27/402* (2024.01);
(Continued)

(58) Field of Classification Search
CPC ...... B64D 27/40; B64D 27/18; B64D 27/402; B64D 27/404; B64D 27/406; F02K 3/06;
(Continued)

(56) References Cited

U.S. PATENT DOCUMENTS

| 4,346,861 A | 8/1982 | Legrand et al. |
| 4,603,821 A | 8/1986 | White |

(Continued)

FOREIGN PATENT DOCUMENTS

| CN | 101253094 | 8/2008 |
| CN | 101774430 | 7/2010 |

(Continued)

OTHER PUBLICATIONS

Chinese National Intellectual Property Administration, "Office Action and Search Report," issued on Jun. 7, 2024 in connection with Chinese Patent Application No. 202110340388.X, 18 pages (including translation).

(Continued)

*Primary Examiner* — Christopher D Hutchens
*Assistant Examiner* — Steven J Shur
(74) *Attorney, Agent, or Firm* — Hanley, Flight & Zimmerman, LLC

(57) ABSTRACT

Methods, apparatus, systems and articles of manufacture are disclosed. An apparatus for mounting a gas turbine engine to a pylon includes: a thrust link coupled to the gas turbine engine and an aft mount, the gas turbine engine coupled to the pylon via a forward mount and the aft mount, a bending restraint having a first end and a second end, the bending restraint including an actuator positioned at the first end to apply a force to a fan section of the gas turbine engine, a first joint positioned at the first end of the bending restraint, the first joint coupled to the first end of the bending restraint and the fan section, and a second joint positioned at the second (Continued)

end of the bending restraint, the second joint coupled to the second end of the bending restraint.

19 Claims, 9 Drawing Sheets

(51) Int. Cl.
   *B64D 27/18* (2006.01)
   *F02C 7/20* (2006.01)

(52) U.S. Cl.
   CPC .......... *B64D 27/404* (2024.01); *B64D 27/406* (2024.01); *F02C 7/20* (2013.01); *F05D 2220/323* (2013.01); *F05D 2220/36* (2013.01); *F05D 2240/91* (2013.01)

(58) Field of Classification Search
   CPC .. F02C 7/20; F05D 2220/323; F05D 2220/36; F05D 2240/91
   See application file for complete search history.

(56) References Cited

U.S. PATENT DOCUMENTS

| | | | |
|---|---|---|---|
| 5,452,575 A * | 9/1995 | Freid | B64D 27/18 244/54 |
| 6,474,597 B1 | 11/2002 | Cazenave | |
| 8,061,649 B2 | 11/2011 | Journade et al. | |
| 8,087,608 B2 | 1/2012 | Combes et al. | |
| 8,156,648 B2 | 4/2012 | Audart-Noel et al. | |
| 8,191,823 B2 | 6/2012 | Guering et al. | |
| 8,215,580 B2 | 7/2012 | Balk | |
| 8,469,309 B2 | 6/2013 | Stuart et al. | |
| 9,429,073 B2 | 8/2016 | Bellabal et al. | |
| 9,637,241 B2 | 5/2017 | Schnelz | |
| 10,239,627 B2 | 3/2019 | Journade et al. | |
| 11,697,506 B2 | 7/2023 | Schelfaut et al. | |
| 2005/0269444 A1* | 12/2005 | Marche | B64D 27/40 244/54 |
| 2006/0253057 A1 | 11/2006 | Qi et al. | |
| 2010/0206981 A1 | 8/2010 | Baillard | |
| 2014/0369810 A1 | 12/2014 | Binks et al. | |
| 2019/0055026 A1* | 2/2019 | Sawyers-Abbott | B64D 27/40 |
| 2021/0284348 A1* | 9/2021 | Whiteford | B64D 27/40 |
| 2021/0300577 A1 | 9/2021 | Coleman et al. | |

FOREIGN PATENT DOCUMENTS

| | | |
|---|---|---|
| CN | 103080481 | 5/2013 |
| CN | 113669115 | 11/2021 |
| EP | 0018252 | 10/1980 |
| WO | 2006103372 | 10/2006 |
| WO | 2015047539 | 4/2015 |

OTHER PUBLICATIONS

United States Patent and Trademark Office, "Restriction," issued in connection with U.S. Appl. No. 16/836,442, mailed on Oct. 13, 2022, 6 pages.

United States Patent and Trademark Office, "Non-Final Office Action," issued in connection with U.S. Appl. No. 16/836,442, mailed on Dec. 22, 2022, 12 pages.

United States Patent and Trademark Office, "Final Office Action," issued in connection with U.S. Appl. No. 16/836,442, mailed on May 15, 2023, 17 pages.

* cited by examiner

ENGINE BACKBONE BENDING REDUCTION

RELATED APPLICATION

This patent arises from a divisional of U.S. patent application Ser. No. 16/836,442, which was filed on Mar. 31, 2020. U.S. patent application Ser. No. 16/836,442 is hereby incorporated herein by reference in its entirety. Priority to U.S. patent application Ser. No. 16/836,442 is hereby claimed.

FIELD OF THE DISCLOSURE

This disclosure relates generally to gas turbines, and, more particularly, to methods and apparatus for engine backbone bending reduction.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

A gas turbine engine produces a thrust that propels a vehicle forward, e.g., a passenger aircraft. The thrust from the engine transmits loads to a wing mount, e.g., a pylon, and likewise the vehicle applies equal and opposite reaction forces onto the wing. This loading induces a bending moment into the engine. There is a continuing need to reduce this bending moment applied to the engine.

Figure 1:
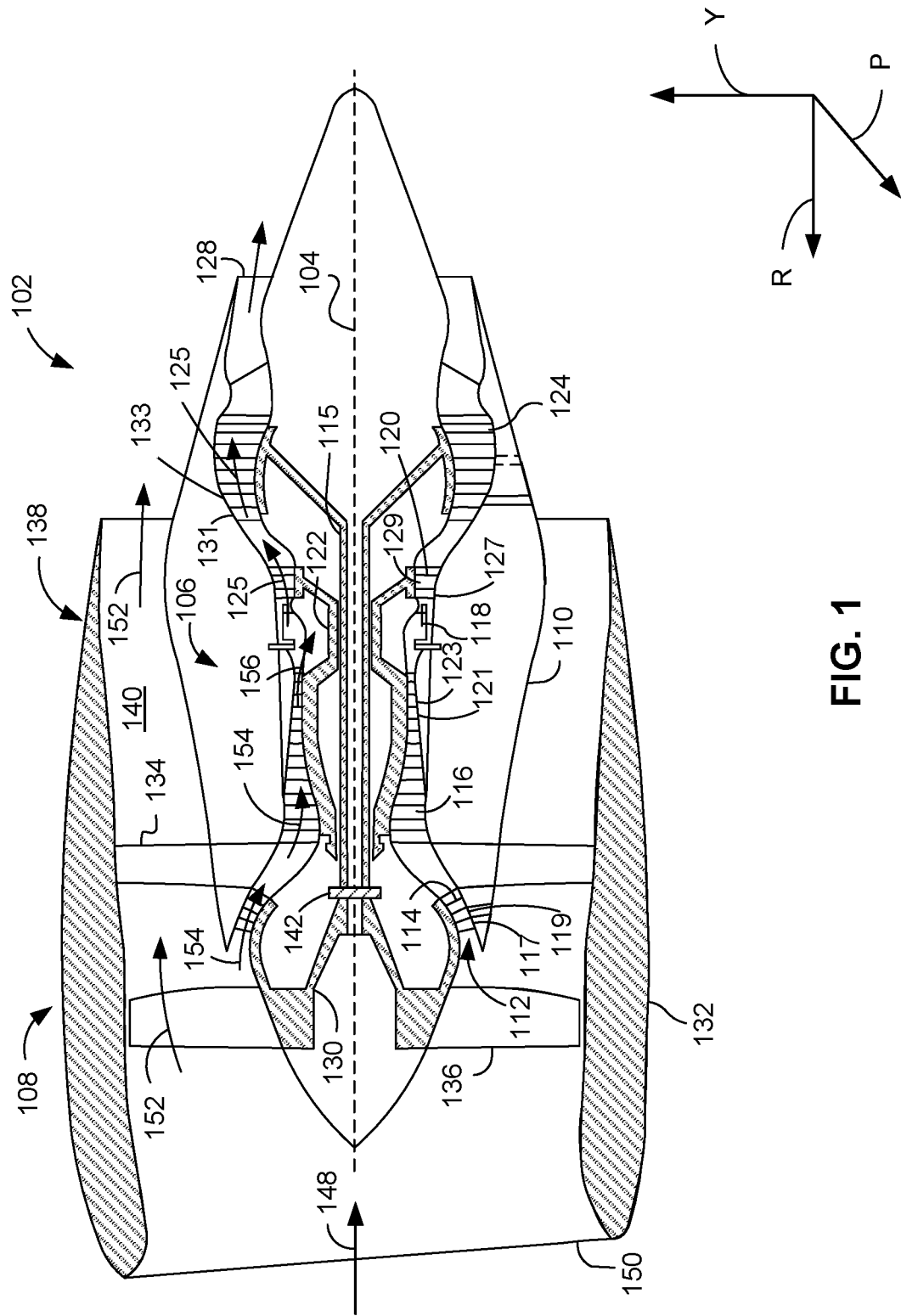
FIG. 1 illustrates an example gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

BRIEF SUMMARY

Methods, apparatus, systems, and articles of manufacture to reduce backbone bending of a turbine engine are disclosed.

Certain examples provide an apparatus including a mechanical linkage for mounting a gas turbine engine to a pylon, the mechanical linkage comprising a bending restraint having a first end and a second end, a first joint at the first end of the bending restraint to connect the first end of the bending restraint to a fan section of the gas turbine engine, and a second joint at the second end of the bending restraint to connect the second end of the bending restraint to the pylon.

Certain examples provide a gas turbine engine comprising a first section including a fan section, a second section including a pylon, and a mechanical linkage between the first section and the second section.

Certain examples provide an apparatus including first means for mounting a gas turbine engine to a pylon, second means for attaching a first bending restraint with respect to a fan section of the gas turbine engine, and third means for attaching the first bending restraint to the pylon.

DETAILED DESCRIPTION

A bending moment is a reaction induced in a structural element when an external force or moment is applied to the element, causing the element to bend. For example, forces acting on an engine fan case during operation of the engine can cause the fan case to try to bend or rotate in an undesirable direction, introducing stress, and eventual wear, on the engine fan case. Certain examples provide a supplemental link or linkage (e.g., a series of one or more links) that restricts the bending motion of the fan case and improves stability and durability of the fan case and associated engines.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine 102. As used herein, "lateral" refers to the direction perpendicular to the axial and vertical directions (e.g., into and out of the plane of FIGS. 1, 2, etc.).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Engines are often mounted to the wings of the aircrafts (e.g., under-wing mounting). The engine is mounted to a pylon. The pylon is designed to withstand high levels of loads and resulting stresses, including thrust loads from the engine, aerodynamic loading and the engine's weight. The pylon includes a forward mount and an aft mount for the engine. The forward mount attaches to the fan section and the aft mount attaches to an outer portion of the engine downstream of the fan section. In some other examples, the engines can be fuselage mounted engines. For example, a fuselage mounted engine and corresponding mounts (e.g., forward mount and aft mount) is rotated 90° with respect to an underwing mounted engine.

When the engine (mounted to the pylon) produces thrust, the pylon reacts this thrust by imposing a bending moment onto the engine body. This moment is often referred to as backbone bending. Some aircraft engine mount systems include one or more thrust links (e.g., thrust linkage) for mounting the engine to the pylon. The thrust links can however also contribute to backbone bending through the entire engine carcass due to the distance between the engine centerline and the intersection point of the thrust link and forward mount.

Backbone bending affects blade clearances at all operating conditions and engine stages. Reducing backbone bending allows for tighter operating clearances, such as cold clearances and cruise clearances. Reducing operating clearances improves specific fuel consumption (engine efficiency), improves engine operability, and reduces deterioration.

Blade tip clearances at several locations throughout the engine are often defined based on the sum of axisymmetric closures and the local circumferential clearance distortions during a take-off (TO) rotation maneuver. That is, in some examples, the minimum blade tip clearances in the compressor (e.g., closest clearances, etc.) can occur during TO engine operation. In some examples, the minimum blade tip clearance at which the compressor can operate during take-off is based on clearance reduction caused in part by engine vibrations and distortion (e.g., strain, etc.) caused by operation of the engine. Operational distortion in an engine can be caused by internal forces in the engine caused by thrust and aero inlet loads, etc. The operational loads can cause the engine body to bend and/or otherwise distort between the forward and aft mount attachment point of engine to the aircraft, for example. Designing an engine to compensate for these distortions (e.g., by increasing cold or cruise clearances) correspondingly reduces engine operating efficiency (e.g., specific fuel consumption, etc.).

Examples disclosed herein can reduce undesired effects caused by these distortions on the engine based on a magnitude of bending moment and clearance losses induced by the force balance between pylon and engine during engine operations. By coupling the fan section to the pylon with a mechanical link, for example, the bending moment of backbone bending is mitigated. The mechanical link can be coupled with one or more pre-existing thrust links, for example. In some examples, the mechanical link includes an actuator to apply force in one direction to the fan section.

Referring now to the drawings, wherein identical numerals indicate the same elements throughout the figures, FIG. 1 is a schematic cross-sectional view of an example high-bypass turbofan-type gas turbine engine 102 ("turbofan 102") as may incorporate various examples disclosed herein. As shown in FIG. 1, the turbofan 102 defines a longitudinal or axial centerline axis 104 extending therethrough for reference. As depicted therein, the gas turbine engine 102 defines a longitudinal or axial centerline axis 104 extending therethrough for reference. As depicted therein, the gas turbine engine 102 defines a roll axis R, a pitch axis P, and a yaw axis Y. The roll axis R extends parallel to the longitudinal axis 104, the yaw axis Y extends orthogonally outwardly from the longitudinal axis 104, and the pitch axis P extends perpendicularly outwardly from the roll axis R and the yaw axis Y (e.g., into and out of the plane of FIG. 1). The turbofan 102 includes a core turbine or gas turbine engine 106 disposed downstream from a fan section 108.

The core turbine engine 106 may generally include a substantially tubular outer casing 110 that defines an annular inlet 112. The outer casing 110 may be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118, a turbine section having a high pressure turbine 120 ("HP turbine 120") and a low pressure turbine 124 ("LP turbine 124"), and an exhaust section 128. A high pressure shaft or spool 122 ("HP shaft 122") drivingly couples the HP turbine 120 and the HP compressor 116. A low pressure shaft or spool 115 ("LP shaft 115") drivingly couples the LP turbine 124 and the LP compressor 114. The LP shaft 115 may also couple to a fan spool or shaft 130 of the fan section 108. In some examples, the LP shaft 115 may couple directly to the fan shaft 130 (i.e., a direct-drive configuration). In alternative configurations, the LP shaft 115 may couple to the fan shaft 130 via a reduction gear 142 (i.e., an indirect-drive or geared-drive configuration).

As shown in FIG. 1, the fan section 108 includes a plurality of fan blades 136 coupled to and extending radially outwardly from the fan shaft 130. An annular fan casing or nacelle 132 circumferentially encloses the fan section 108 and/or at least a portion of the core turbine 106. The nacelle 132 may be supported relative to the core turbine 106 by a plurality of circumferentially-spaced apart outlet guide vanes 134. Furthermore, a downstream section 138 of the nacelle 132 may enclose an outer portion of the core turbine 106 to define a bypass airflow passage 140 therebetween.

As illustrated in FIG. 1, air 148 enters an inlet portion 150 of the turbofan 102 during operation thereof. A first portion 152 of the air 148 flows into the bypass flow passage 140, while a second portion 154 of the air 148 flows into the inlet 112 of the LP compressor 114. One or more sequential stages of LP compressor stator vanes 117 and LP compressor rotor blades 119 coupled to the LP shaft 115 progressively compress the second portion 154 of the air 148 flowing through the LP compressor 114 en route to the HP compressor 116. Next, one or more sequential stages of HP compressor stator vanes 121 and HP compressor rotor blades 123 coupled to the HP shaft 122 further compress the second portion 154 of the air 148 flowing through the HP compressor 116. This provides compressed air 156 to the combustion section 118 where it mixes with fuel and burns to provide combustion gases 125.

The combustion gases 125 flow through the HP turbine 120 where one or more sequential stages of HP turbine stator vanes 127 and HP turbine rotor blades 129 coupled to the HP shaft 122 extract a first portion of kinetic and/or thermal energy therefrom. This energy extraction supports operation of the HP compressor 116. The combustion gases 125 then flow through the LP turbine 124 where one or more sequential stages of LP turbine stator vanes 131 and LP turbine rotor blades 133 coupled to the LP shaft 115 extract a second portion of thermal and/or kinetic energy therefrom. This energy extraction causes the LP shaft 115 to rotate, thereby supporting operation of the LP compressor 114 and/or rotation of the fan shaft 130. The combustion gases 125 then exit the core turbine 106 through the exhaust section 128 thereof.

Along with the turbofan 102, the core turbine 106 serves a similar purpose and sees a similar environment in land-based gas turbines, turbojet engines in which the ratio of the first portion 152 of the air 148 to the second portion 154 of the air 148 is less than that of a turbofan, and unducted fan engines in which the fan section 108 is devoid of the nacelle 132. In each of the turbofan, turbojet, and unducted engines, a speed reduction device (e.g., the reduction gearbox 142) may be included between any shafts and spools. For example, the reduction gearbox 142 may be disposed between the LP shaft 115 and the fan shaft 130 of the fan section 108.

Figure 2A:
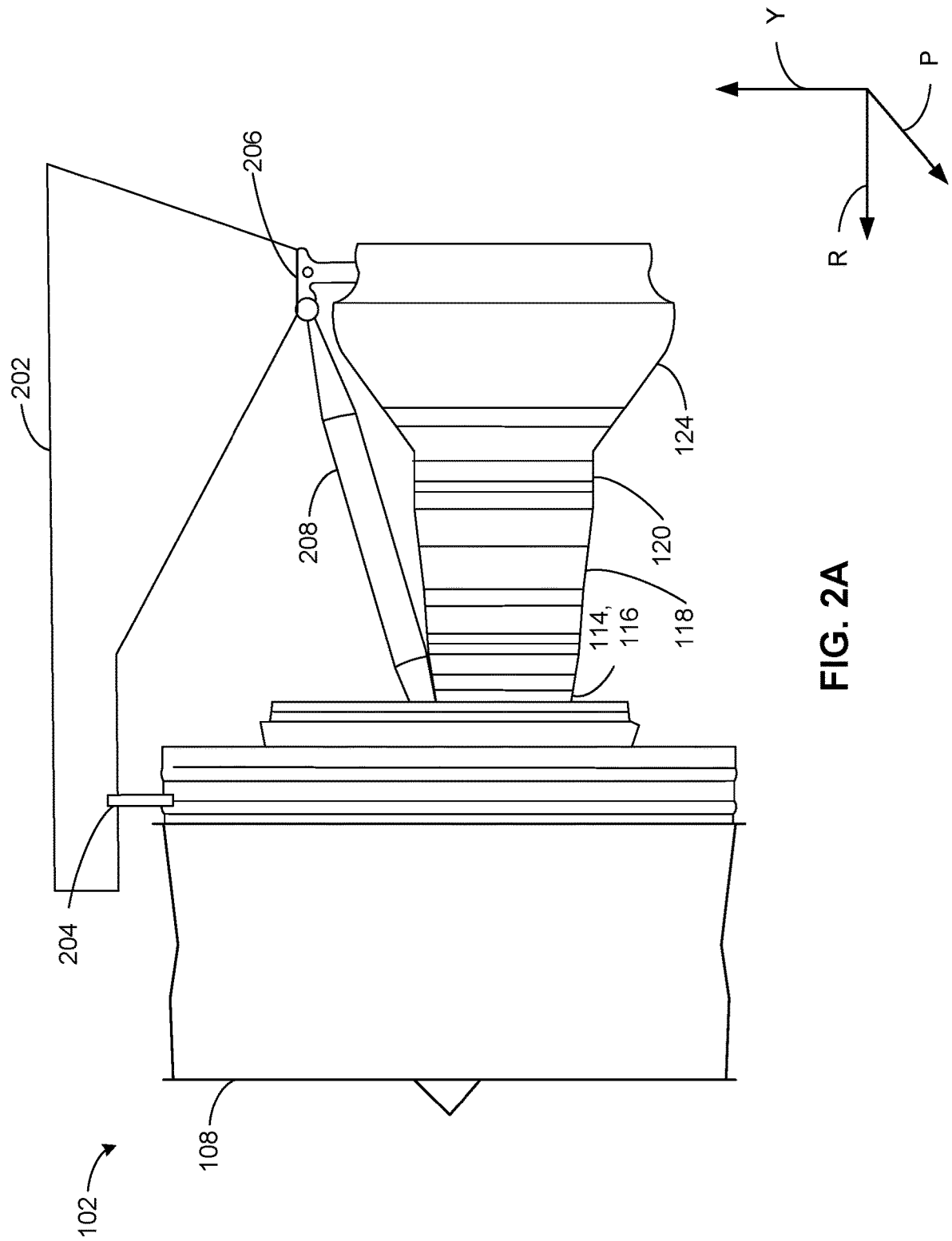
FIG. 2A illustrates an example first side view of a gas turbine engine mounted to an aircraft wing.

FIG. 2A is a side view of the example gas turbine engine 102 of FIG. 1 mounted to an aircraft wing via a pylon 202. The gas turbine engine 102 is mounted to the pylon 202 via a forward mount 204 and an aft mount 206. While the gas turbine engine 102 of FIGS. 2-7 is mounted to an aircraft via under-wing mounting the gas turbine engine 102 can be a fuselage mounted engine. The gas turbine engine 102 includes the fan section 108, the LP compressor 114, the HP compressor 116, the combustion section 118, the HP turbine 120, and the LP turbine 124. The gas turbine engine 102 includes a thrust link 208.

In the illustrated example, the gas turbine engine 102 is a turbofan (e.g., a high bypass turbofan, a low bypass turbofan, etc.). However, the gas turbine engine 102 can be another type of gas turbine engine (e.g., turboprop, turbojet, etc.). The gas turbine engine 102 of FIG. 1 is a two-spool engine. In other examples, the gas turbine engine 102 can include another number of spools (e.g., one spool, three spools, etc.) and an associated number of corresponding sections. In some examples, the gas turbine engine 102 includes components not depicted in FIGS. 1 and/or 2 (e.g., an afterburner, etc.). While examples disclosed herein are described with reference to a gas turbine mounted to a wing, the teachings of this disclosure should not be limited exclusive to gas turbine engines. Instead, the teachings of this disclosure can be applied to another type of gas turbine and/or internal combustion engine (e.g., turboprop, turbojet, etc.).

The forward mount 204 and the aft mount 206 couple or otherwise connect the gas turbine engine 102 to the pylon 202. The mounts 204, 206 react the forces that the gas turbine engine 102 applies to the pylon 202 during operation. The mounts 204, 206 react the weight, thrust, and aerodynamic and related engine forces during aircraft operations. Operation of the gas turbine engine 102 produces axial forces, lateral forces, and/or bending moments that, when reacted by the mounts 204, 206, exert equal and opposite equilibrating forces on the outer casing 110 and body. These forces generate internal loading within the engine and the fan section 108. In FIG. 2A, the fan section 108 is connected to the aft mount 206 via the thrust link 208.

In FIG. 2A, the forward mount 204 constrains the vertical and lateral movement of the fan section 108 and can also prevent rotation about the roll axis. The forward mount 204 can be implemented by three couplings (e.g., three links, etc.). The aft mount 206 can be implemented by three couplings (e.g., three links, etc.). In other examples, the aft mount 206 can be implemented by a multi-pin link (e.g., a 2-pin boomerang link, a 3-pin swing link, a triangle link, a straight link with a center pin, etc.), a fixed link, other linkage, etc. In combination, the forward mount 204 and the aft mount 206 constrain all six degrees of freedom (e.g., translational along the roll axis, translational along the pitch axis, translational along the yaw axis, rotational about the roll axis, rotational about the pitch axis, and rotational about the yaw axis). That is, the forward mount 204 and the aft mount 206 prevent the fan section 108 and core turbine 106 from translating and/or rotating relative to the pylon 202.

For example, the forward mount 204 constrains translational movement along the yaw and pitch axes, and rotational movement about the roll axis. Thus, the aft mount 206 constrains translational movement along the roll axis and rotational movement about the yaw and pitch axes. The thrust link 208 constrains the motion of the fan section 108 along the roll axis.

Figure 2B:
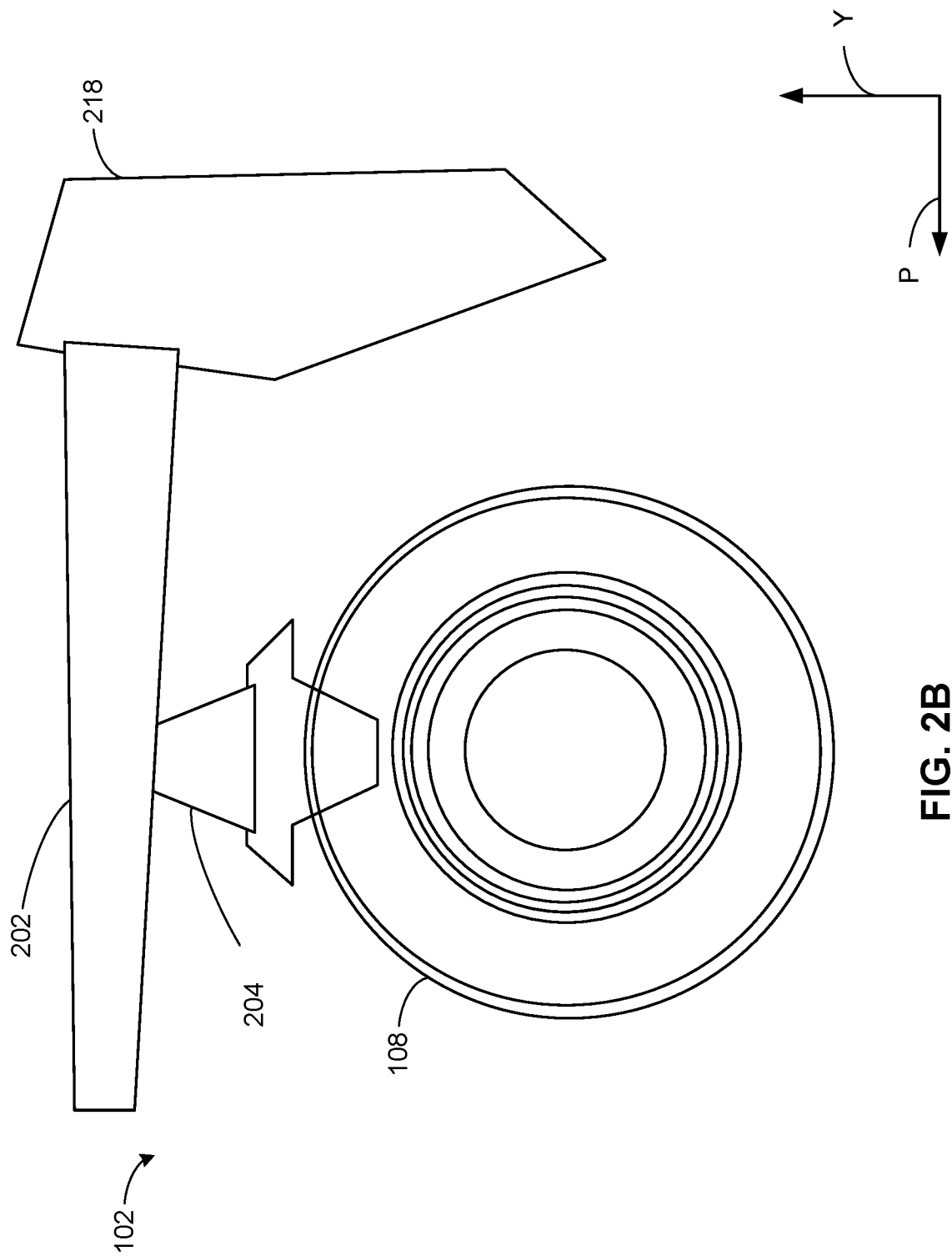
FIG. 2B illustrates a front view of the gas turbine engine and aircraft wing of FIG. 2A.

FIG. 2B is a front view of the gas turbine engine 102 of FIG. 2A. In the illustrated example of FIG. 2B, the pylon 202 is connected to a fuselage 218 of an aircraft. In other examples, the gas turbine engine 102 can be connected to another location on the aircraft (e.g., a body mounted engine, a tail mounted engine, etc.).

Figure 3:
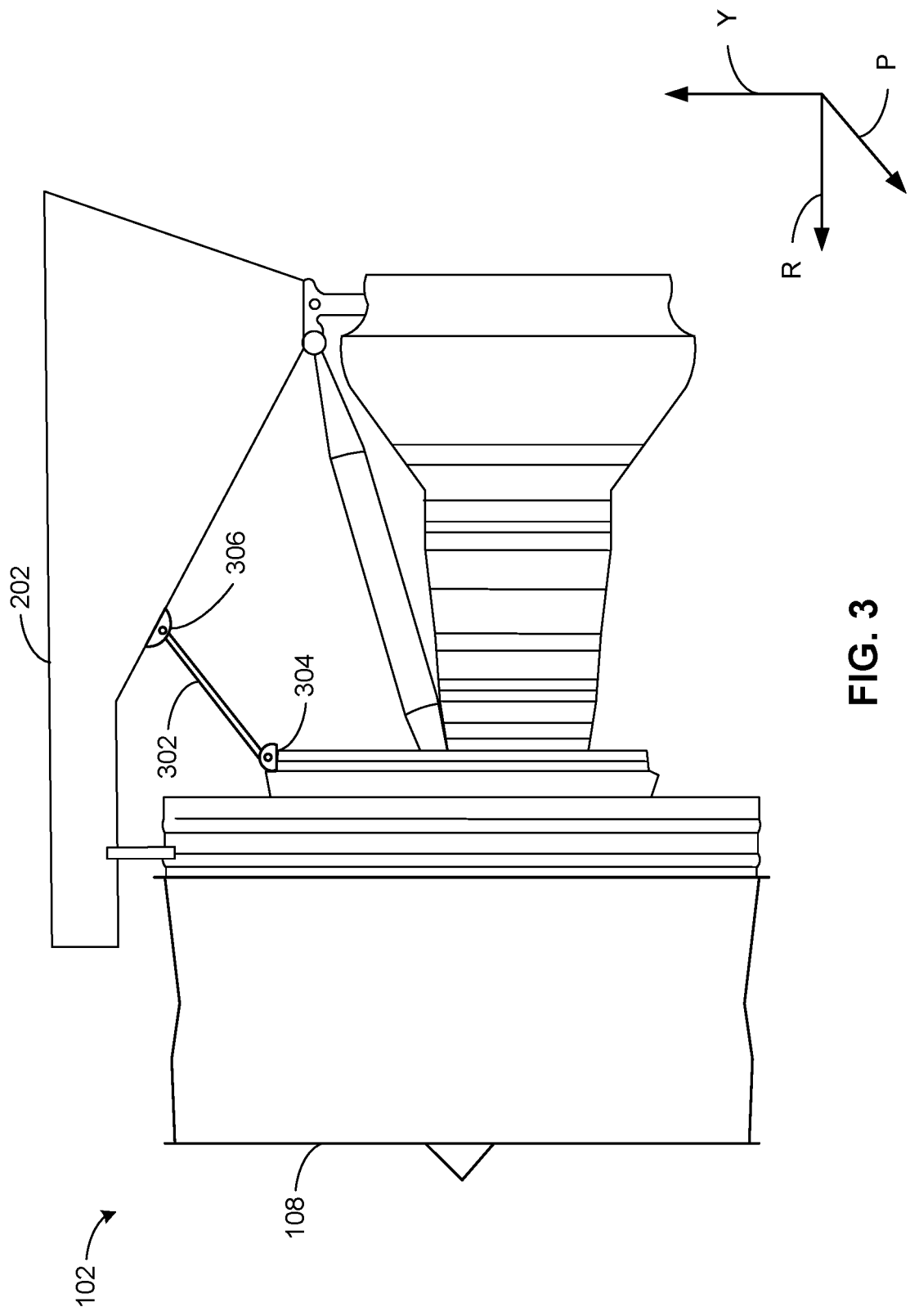
FIG. 3 illustrates an example side view of the gas turbine engine of FIGS. 2A-2B depicting a bending restraint between a fan frame and a pylon.

FIG. 3 illustrates an example side view of the gas turbine engine 102 of FIGS. 2A-2B including a backbone bending reduction restraint, link, or linkage 302 (referred to herein as a bending restraint) between the fan section 108 and the pylon 202. In more detail, the bending restraint 302 connects the fan section 108 to the pylon 202 using a first joint 304 and a second joint 306. In such examples, the bending restraint 302 reacts engine-pylon loads acting along the thrust (or engine longitudinal) axis to loads along the roll axis transmitted between the fan section 108 and the engine core. That is, the bending restraint 302 prevents backbone bending moments from being transmitted between the fan section 108 and the engine core (e.g., bending moments about the pitch axis). The bending restraint 302 is disposed between the fan section 108 and the pylon 202. Additionally or alternatively, the bending restraint 302 can be connected between other components of the gas turbine engine 102. That is, the bending restraint 302 can be attached to an axial location upstream and/or downstream of the LP compressor 114, the HP compressor 116, the combustion section 118, the HP turbine 120, and the LP turbine 124. The bending restraint 302 can be formed from a variety of metals such as cold roll steel, titanium alloys, Inconel alloy 718, iron or nickel alloys with adequate strength, fatigue, and/or other material characteristics, etc.

The first end of the bending restraint 302 is connected to the gas turbine engine 102 at the fan section 108 via a first joint 304. The first joint 304 can be a pin joint. The second end of the bending restraint 302 is connected to the pylon 202 via a second joint 306. The second joint 306 is a pin joint, for example. The first joint 304 and the second joint 306 react forces along the axis of the link (e.g., due to thrust force, etc.) in the roll direction. The joints 304, 306 can be formed from metals such as cold roll steel, titanium alloys, etc. The joints 304, 306 can be implemented as a link-clevis pin joint (e.g., link lug pinned between two devises, two lugs pinned to a single clevis attachment point, etc.), a clevis that will accommodate the spherical bearing pin joint geometry, etc.

Figure 4:
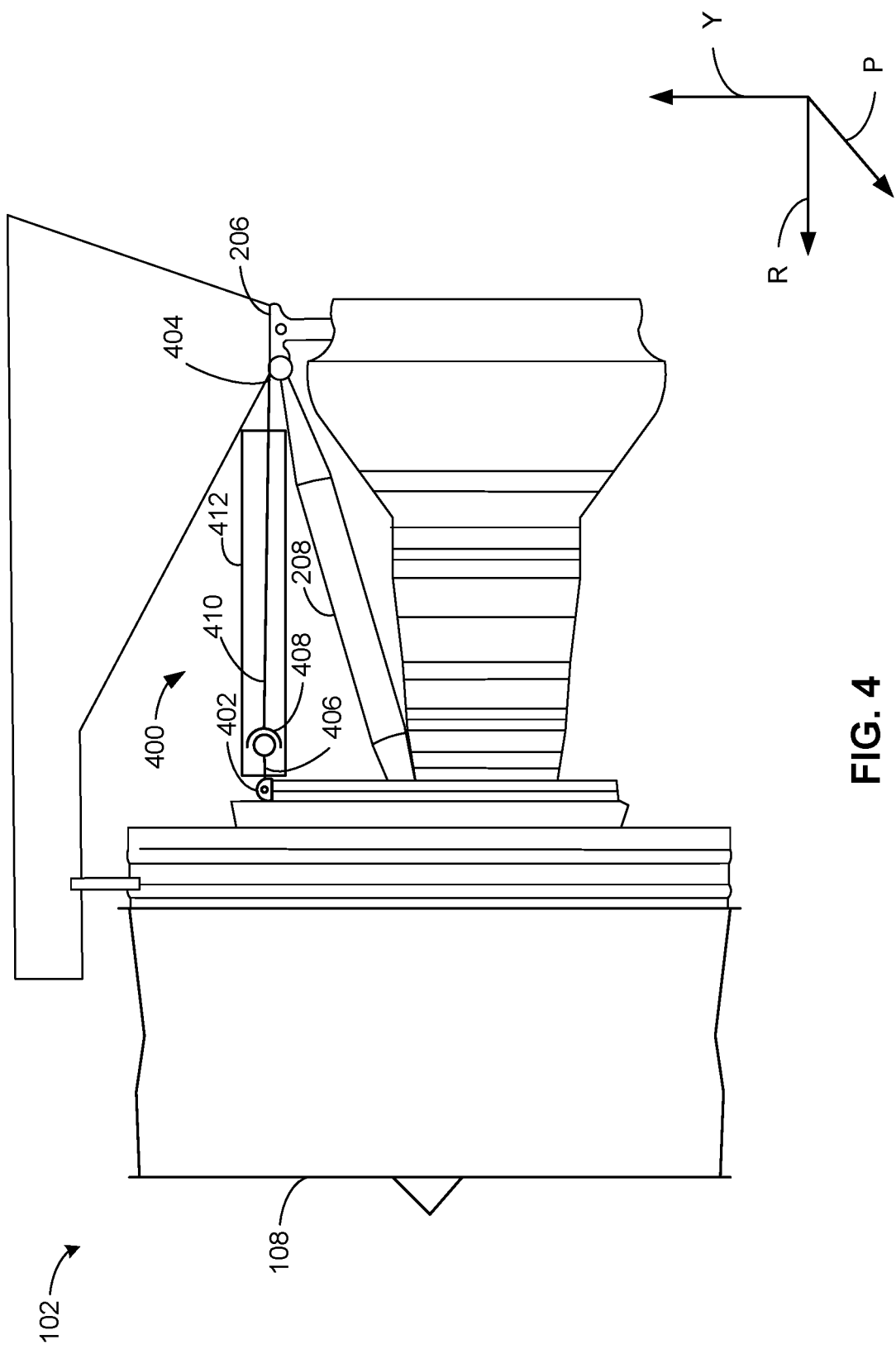
FIG. 4 illustrates an example side view of the gas turbine engine of FIGS. 2A-2B depicting a second example bending restraint.

FIG. 4 illustrates a side view of the gas turbine engine 102 of FIGS. 2A and 2B depicting a bending restraint system 400. The bending restraint system 400 is disposed between the fan section 108 and the aft mount 206. The bending restraint system 400 is connected to the fan section 108 via a first joint 402. The joint 402 is a pin joint (e.g., link-clevis pin joint, etc.), for example. The bending restraint system 400 can be connected to the aft mount 206 via a second joint 404. In some examples, the second joint 404 is a whiffletree joint. The whiffletree joint includes a plurality of segments or attachment points to connect two or more bending restraints to the pylon 202 (e.g., illustrated further below in connection with FIGS. 5A-5B and 6). In certain examples, the whiffletree joint includes two attachment points. However, in other examples, the whiffletree joint includes three attachment points. The whiffletree joint (e.g., the second joint 404) distributes one or more forces (e.g., backbone bending moments, etc.) evenly to each link or segment (e.g., the bending restraint(s) 410, the thrust link(s) 208, etc.) attached to the joint.

The whiffletree joint can connect to the aft mount 206 via one or more joints including a pin joint or a ball and socket joint. For example, the whiffletree joint can be connected to the aft mount 206 via a pin joint such that the whiffletree joint only translates motion along the pitch axis. In other examples, the whiffletree joint is connected to the aft mount 206 via a ball and socket joint to release a degree of freedom along the yaw axis (e.g., the whiffletree joint can translate motion along the yaw axis by moving freely in the socket with respect to the ball). However, the joint reacts force introduced along the roll axis, locking the socket with respect to the ball to prevent motion and counter the bending moment. Additional details associated with the second joint 404 are described below in connection with FIGS. 5A, 5B, and 6. The joints 402, 404 can be formed of metal such as cold roll steel, titanium alloys, etc.

In some examples, the bending restraint system 400 includes one or more link(s) 406 forming a linkage (e.g., the bending restraint 302 of FIG. 3, thrust links 208 of FIG. 2A, etc.). The link(s) 406 can be connected together with a joint 408. The joint 408 can be a spherical bearing pin joint. That is, the joint 408 allows translational movement along the roll axis but restricts translational movement along the yaw axis (e.g., allows for compressive loads). In some other examples, the joint 408 is a ball and socket joint, which allows translational movement along the roll and yaw axes. The joint 408 reacts thrust loads along the roll axis transmitted between the fan section 108 and the pylon 202. The bending restraint system 400 can also include one or more link(s) 410 to form a linkage. In some examples, the links 410 are compression-only links. A compression-only link reacts forces and/or loads in the roll direction but not in the yaw direction. For example, implementing the link 410 as a compression-only link enables the link 410 to not react a thrust load in the yaw direction but react a bending moment in the roll direction.

The links 410 are disposed between the joint 408 and the pylon 202. For example, the links 410 are connected to the pylon 202 via the second joint 404. In the illustrated example, the bending restraint system 400 includes a buckling stabilizer shell 412. The buckling stabilizer shell 412 includes the link(s) 406, the joint 408, and/or the link(s) 410. The buckling stabilizer shell 412 adjusts loads along the pitch, roll, and yaw axes transmitted between the fan section 108 and the pylon 202. That is, in some examples, the buckling stabilizer shell 412 reduces the loads to the link(s) 406, 410 (e.g., prevents buckling of the link(s) 406, 410). The buckling stabilizer shell 412 can be formed from metal such as cold roll steel, titanium alloys, iron or nickel alloys with adequate strength, fatigue, and/or other material characteristics, etc.

Figure 5B:
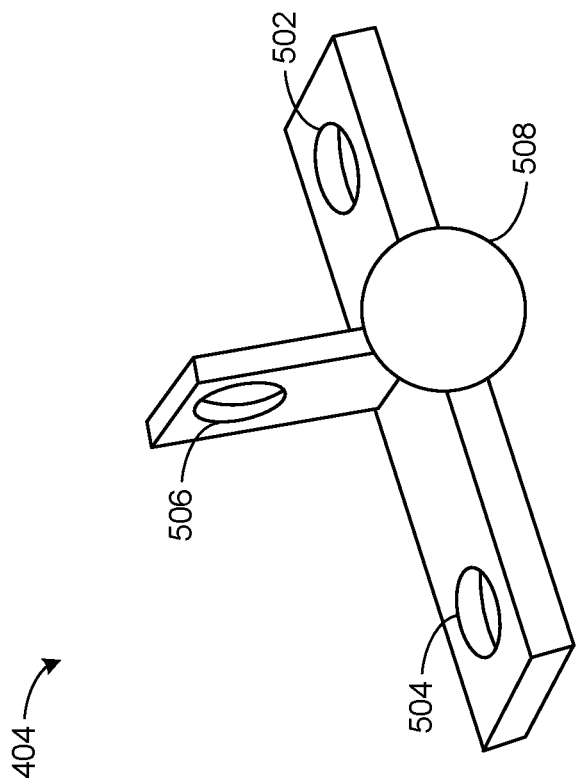
FIGS. 5A and 5B illustrate an example bending restraint joint.
Figure 5A:
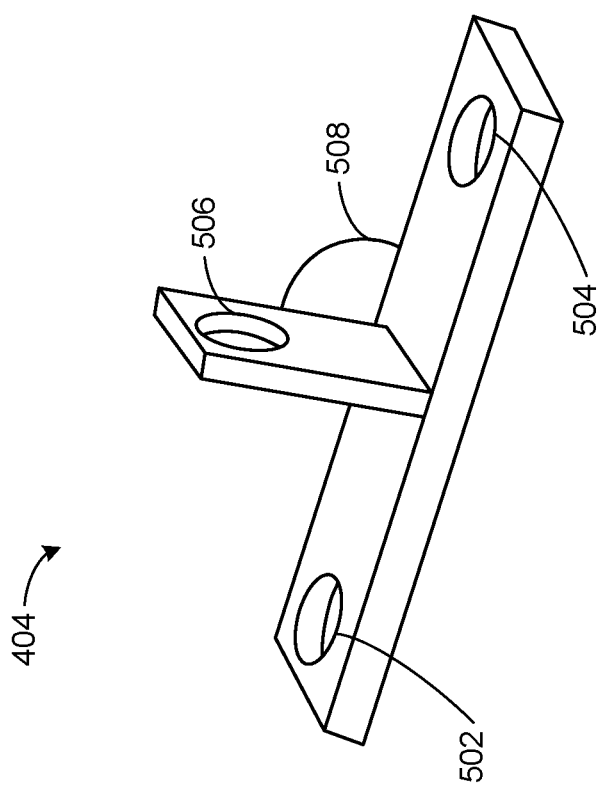

FIGS. 5A and 5B illustrate the joint 404 implemented as a whiffletree joint. FIG. 5A illustrates a front view of the joint 404. FIG. 5B illustrates a back view of the joint 404. The joint 404 includes a first opening 502 (e.g., a slot, a hole, etc.), a second opening 504, and a third opening 506. The link(s) 410 (e.g., the bending restraint 302 of FIG. 3) and/or the thrust link 208 of FIG. 2A can attach to the second joint 404 via the first opening 502, the second opening 504, and/or the third opening 506. The second joint 404 can also include a joint 508. The joint 508 can be a pin joint, a gimbal joint, a socket joint, etc. The joint 508 can be flexible in both the pitch and yaw directions. The pylon 202 can be connected to the second joint 404 via the joint 508.

Figure 6:
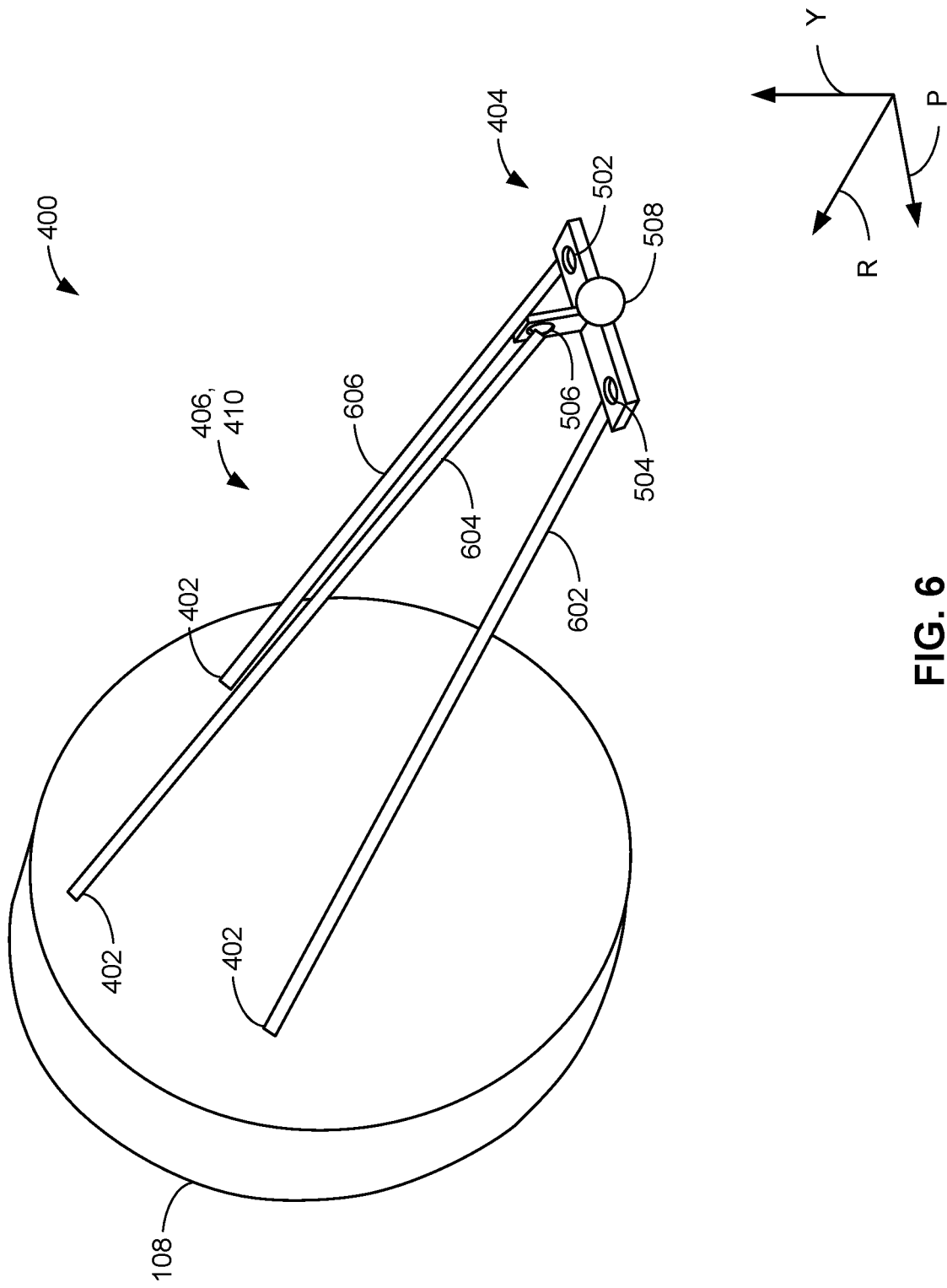
FIG. 6 illustrates an example bending restraint system between the fan frame and the joint.

FIG. 6 illustrates a stylized representation of the bending restraint system 400 of FIG. 4 positioned between the fan section 108 and the second joint 404. The links 406, 410 are connected to the fan section 108 via the first joint 402 (e.g., pin joints). The link(s) 406, 410 include a first link 602, a second link 604, and a third link 606. In some examples, the first link 602 and the third link 606 are thrust links (e.g., the thrust link 208 of FIG. 2A) and the second link 604 is the bending restraint 302 of FIG. 3. The second link 604 can include a joint (not illustrated, such as the joint 408 of FIG. 4). That is, the second link 604 can include a first segment (e.g., the link 406 of FIG. 4) and a second segment (e.g., the link 410 of FIG. 4). The first link 602 is connected to the second opening 504, the second link 604 is connected to the third opening 506, and the third link 606 is connected to the first opening 502 of FIGS. 5A and 5B.

Figure 7:
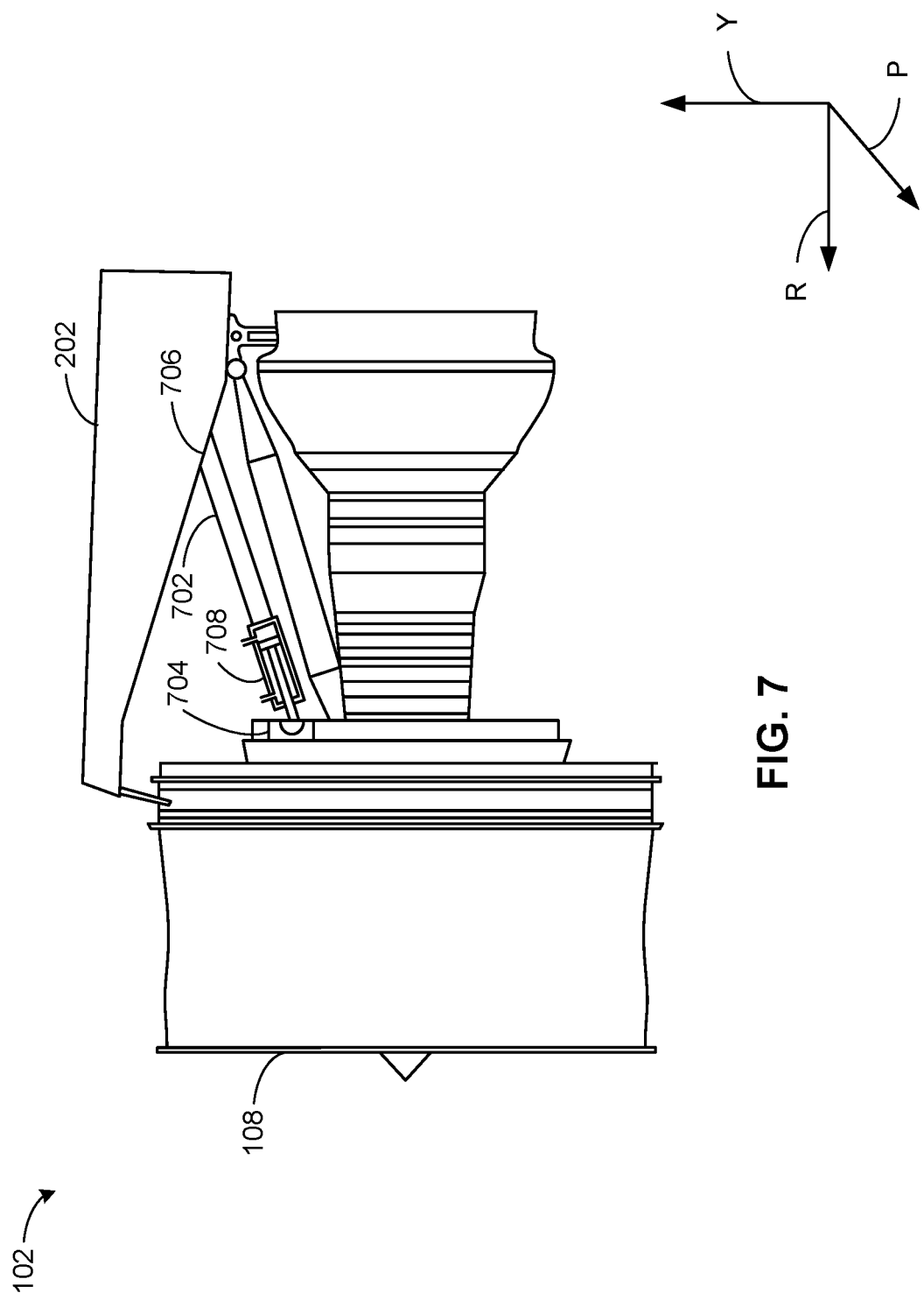
FIG. 7 illustrates an example side view of the gas turbine engine of FIGS. 2A-2B depicting a third example bending restraint including an actuator.

FIG. 7 illustrates the side view of the gas turbine engine 102 of FIGS. 2A-2B depicting a bending restraint 702 including an actuator 708. The bending restraint 702 can be formed of metal such as steel, titanium alloys, iron or nickel alloys with adequate strength, fatigue, and/or other material characteristics etc. A first end of the bending restraint 702 is connected to the gas turbine engine 102 at the fan section 108 via a first joint 704. A second end of the bending restraint 702 is connected to the pylon 202 via a second joint 706. The joint(s) 704, 706 can be a spherical bearing pin joint. The joint(s) 704, 706 can be formed of metal such as steel, titanium alloys, iron or nickel alloys with adequate strength, fatigue, and/or other material characteristics, etc. The first end of the bending restraint 702 includes an actuator 708 to apply a variable force to the fan section 108. The actuator 708 can be a one-way actuator, for example. That is, the bending restraint 702 does not react forces generated by the actuator 708 or force(s) associated with the gas turbine engine 102 (e.g., thrust force, etc.). The actuator 708 can be a hydraulic actuator, for example. However, the actuator 708 can additionally or alternatively be a pneumatic actuator, an electric actuator, etc. The actuator 708 can apply a variable amount of force in one direction to the fan section 108. The magnitude of the force applied by the actuator 708 is determined based on a combination of one or more factors such as the angle of attack, fan speed, Mach number, model of the gas turbine engine 102, ambient conditions (altitude, wind direction, wind speed, ambient pressure, temperature, etc.), etc.

Figure 8:
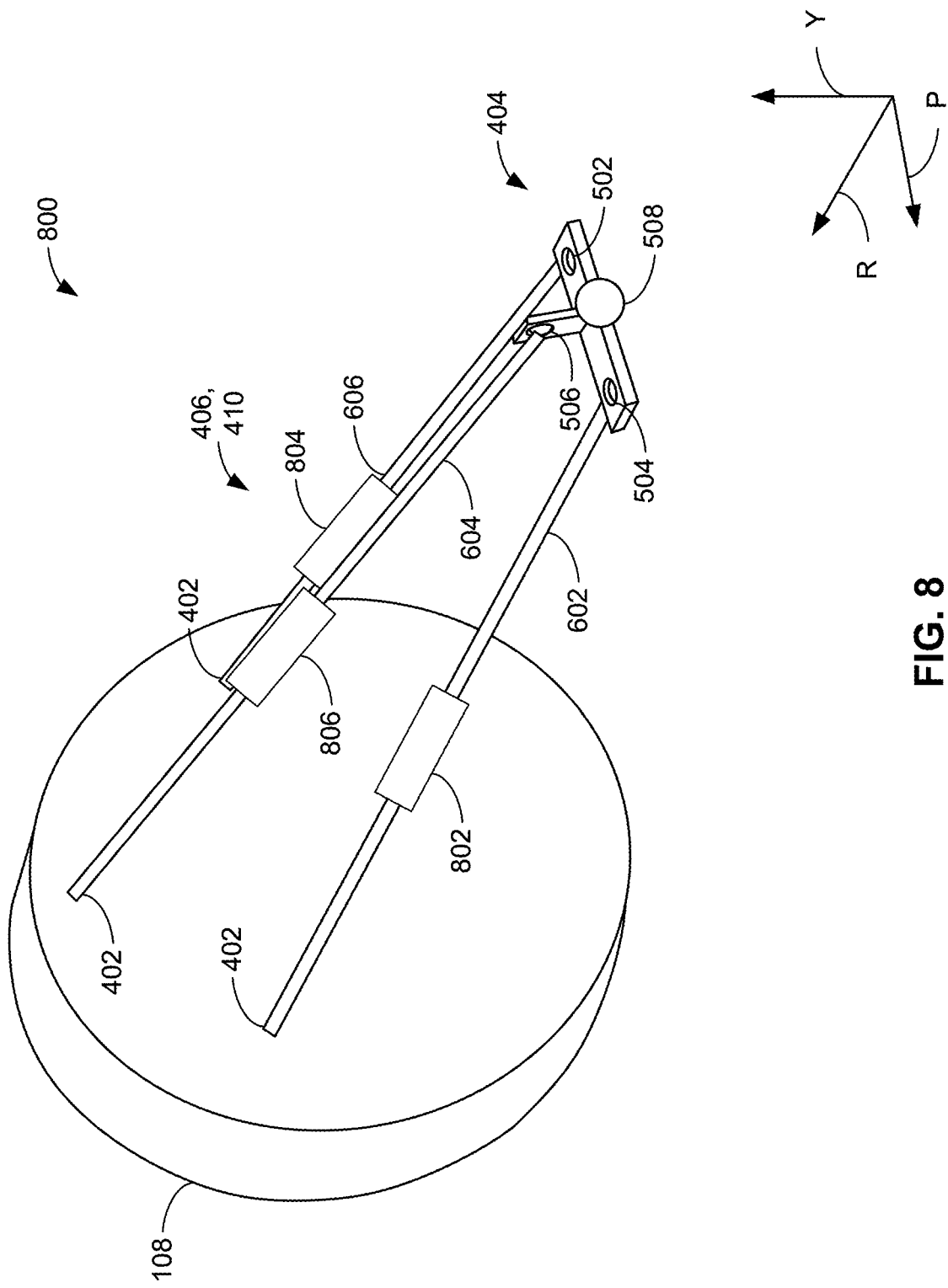
FIG. 8 illustrates an example side view of the gas turbine engine of FIGS. 2A-2B depicting a third example bending restraint.

The bending restraint 302, the bending restraint system 400, and/or the bending restraint 702 can be combined, divided, re-arranged, etc. For example, one or more bending restraint(s) 406 of the bending restraint system 400 of FIG. 4 can include an actuator (e.g., the actuator 708 of FIG. 7). FIG. 8 includes an example bending restraint system 800 similar to the bending restraint system 400 of FIG. 4, except that the first link 602 includes an example first actuator 802, the second link 604 includes an example second actuator 804, and the third link 606 includes an example third actuator 806. One or more of the actuators 802, 804, 806 can be implemented by an actuator similar to the actuator 708 of FIG. 7. In some other examples, the bending restraint 702 can include another number of bending restraint(s) 702 (e.g., the one or more bending restraint(s) 406 of FIG. 4). A series of one or more links can also be referred to as a linkage, for example.

The bending restraint 302, the bending restraint system 400, and/or the bending restraint 702 can prevent and/or reduce strain and/or deflections caused by internal bending moments between the fan section 108 and the engine core from occurring in the fan section 108 and/or engine core. The reduction/prevention of bending moment induced strains and/or deflections can enable tighter operational tip clearances between the blades of the turbomachinery and the engine casing. The improved operational tip clearances can improve engine efficiency, engine operability, and fuel consumption (e.g., reduce specific fuel consumption (SFC)).

In operation, the bending restraint(s) (e.g., the bending restraint 302, the bending restraint system 400, the bending restraint 702, etc.) connected to the fan section 108 and pylon 202 provide support to react forces generated by the gas turbine engine 102. That is, the examples disclosed herein increase gas turbine efficiency (e.g., specific fuel consumption, etc.) by enabling close blade tip clearance in the rotors of the engine. In some examples, the bending restraint(s) positioned between the fan section 108 and the pylon 202 prevent bending moments from being transmitted to the gas turbine which reduces the distortions, strain and/or bending caused by gas turbine operation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to reduce backbone bending are disclosed herein.

Further aspects of the invention are provided by the subject matter of the following clauses. Example 1 includes a mechanical linkage for mounting a gas turbine engine to a pylon, the mechanical linkage comprising: a bending restraint having a first end and a second end; a first joint at the first end of the bending restraint to connect the first end of the bending restraint to a fan section of the gas turbine engine; and a second joint at the second end of the bending restraint to connect the second end of the bending restraint to the pylon.

Example 2 includes the mechanical linkage of any preceding clause, wherein the first joint and the second joint are pin joints.

Example 3 includes the mechanical linkage of any preceding clause, wherein the bending restraint is a first bending restraint, and further including a second bending restraint having a first end and a second end and a third bending restraint having a first end and a second end.

Example 4 includes the mechanical linkage of any preceding clause, wherein the third bending restraint is a compression-only bending restraint.

Example 5 includes the mechanical linkage of any preceding clause, wherein the second end of the second bending restraint and the first end of the third bending restraint are connected via a third joint.

Example 6 includes the mechanical linkage of any preceding clause, wherein the third joint is a ball and socket joint.

Example 7 includes the mechanical linkage of any preceding clause, further including a buckling stabilizer shell.

Example 8 includes the mechanical linkage of any preceding clause, further including a first thrust linkage having a first end and a second end, a second thrust linkage having a first end and a second end, a third joint at the first end of the first thrust linkage, and a fourth joint at the second end of the first thrust linkage.

Example 9 includes the mechanical linkage of any preceding clause, wherein the third joint connects the first end of the first thrust linkage to the fan frame of the gas turbine engine.

Example 10 includes the mechanical linkage of any preceding clause, wherein the fourth joint connects the second end of the first thrust linkage to the second end of the first bending restraint.

Example 11 includes the mechanical linkage of any preceding clause, wherein the fourth joint is a whiffletree joint.

Example 12 includes the mechanical linkage of any preceding clause, wherein the whiffletree joint connects the second end of the first bending restraint, the second end of the first thrust linkage, and the second end of the second thrust linkage to the pylon.

Example 13 includes the mechanical linkage of any preceding clause, wherein the fourth joint further includes a gimbal joint to connect the second joint to the pylon.

Example 14 includes the mechanical linkage of any preceding clause, further including an actuator to apply a force on the fan section of the gas turbine engine.

Example 15 includes the mechanical link of any preceding clause, wherein the actuator is a hydraulic actuator.

Example 16 includes a gas turbine engine comprising: a first section including a fan section; a second section including a pylon; and a mechanical linkage between the first section and the second section.

Example 17 includes the gas turbine engine of any preceding clause, wherein the mechanical linkage further includes a bending restraint.

Example 18 includes the gas turbine engine of any preceding clause, wherein the bending restraint further includes an actuator.

Example 19 includes an apparatus comprising: first means for mounting a gas turbine engine to a pylon; second means for attaching a first bending restraint with respect to a fan section of the gas turbine engine; and third means for attaching the first bending restraint to the pylon.

Example 20 includes the apparatus of any preceding clause, further including means for attaching a second bending restraint to the fan section of the gas turbine engine.

The following claims are hereby incorporated into this Detailed Description by this reference, with each claim standing on its own as a separate embodiment of the present disclosure.

What is claimed is:

1. An apparatus for mounting a gas turbine engine to a pylon, the apparatus comprising:
   a thrust link coupled to the gas turbine engine and an aft mount, the gas turbine engine coupled to the pylon via a forward mount and the aft mount;
   a bending restraint having a first end and a second end, the bending restraint including an actuator positioned at the first end to apply a force to a fan section of the gas turbine engine, the bending restraint configured to not react a thrust force generated by the gas turbine engine;
   a first joint positioned at the first end of the bending restraint, the first joint to couple the first end of the bending restraint to the fan section; and
   a second joint positioned at the second end of the bending restraint, the second joint coupled to the second end of the bending restraint.

2. The apparatus of claim 1, wherein the first joint and the second joint are spherical bearing pin joints.

3. The apparatus of claim 1, wherein the bending restraint includes a first link and a second link, the first link having a first end and a second end, the second link having a first end and a second end, the first end of the first link coupled to the first joint, the second end of the second link coupled to the second joint.

4. The apparatus of claim 3, wherein the second link is a compression-only link.

5. The apparatus of claim 3, wherein the second end of the first link and the first end of the second link are coupled to a third joint.

6. The apparatus of claim 5, wherein the third joint is a ball and socket joint.

7. The apparatus of claim 5, further including a buckling stabilizer shell, the third joint and the actuator disposed within the buckling stabilizer shell.

8. The apparatus of claim 3, wherein the first link includes the actuator.

9. The apparatus of claim 3, wherein the second link includes the actuator.

10. The apparatus of claim 1, wherein the second joint is coupled to the pylon and is longitudinally positioned between the forward mount and the aft mount.

11. The apparatus of claim 1, wherein the second joint is a whiffletree joint coupled to the aft mount.

12. The apparatus of claim 1, wherein the actuator is a one-way actuator.

13. The apparatus of claim 1, wherein the actuator is a hydraulic actuator.

14. The apparatus of claim 1, wherein a magnitude of the force the actuator is to apply to the fan section is determined based on at least an angle of attack, a fan speed, and a Mach number.

15. The apparatus of claim 14, wherein the magnitude of the force is further determined based on an altitude of the gas turbine engine.

16. A gas turbine engine comprising:
   a turbine section coupled to a pylon via an aft mount;
   a fan section coupled to the pylon via a forward mount;
   a thrust link coupled to the fan section and the aft mount; and
   a bending restraint coupled the fan section and the pylon, the bending restraint including an actuator, the bending restraint configured to not react a thrust force generated by the gas turbine engine.

17. The gas turbine engine of claim 16, wherein the bending restraint is coupled to the fan section via a first joint and is coupled to the pylon via a second joint, the actuator positioned adjacent to the first joint.

18. The gas turbine engine of claim 17, wherein the second joint is longitudinally positioned between the forward mount and the aft mount.

19. An apparatus comprising:
   first means for mounting a gas turbine engine to a pylon;
   second means for mounting the gas turbine engine to the pylon;
   means for linking the gas turbine engine to the second means for mounting;
   first means for attaching a bending restraint to a fan section of the gas turbine engine; and
   second means for attaching the bending restraint to the pylon, the second means for attaching positioned between the first means for mounting and the second means for mounting, the bending restraint includes an actuator to apply a force to the fan section of the gas turbine engine, the bending restraint configured to not react a thrust force generated by the gas turbine engine.

* * * * *